(12) United States Patent
Hoover

(10) Patent No.: US 10,957,099 B2
(45) Date of Patent: Mar. 23, 2021

(54) SYSTEM AND METHOD FOR DISPLAY OF VISUAL REPRESENTATIONS OF VEHICLE ASSOCIATED INFORMATION BASED ON THREE DIMENSIONAL MODEL

(71) Applicant: Honda Motor Co., Ltd., Tokyo (JP)

(72) Inventor: Andrew R. Hoover, West Liberty, OH (US)

(73) Assignee: Honda Motor Co., Ltd., Tokyo (JP)

( * ) Notice: Subject to any disclaimer, the term of this patent is extended or adjusted under 35 U.S.C. 154(b) by 61 days.

(21) Appl. No.: 16/194,135

(22) Filed: Nov. 16, 2018

(65) Prior Publication Data

US 2020/0160594 A1 May 21, 2020

(51) Int. Cl.
*G06T 17/00* (2006.01)
*G06T 11/60* (2006.01)
*G06N 20/00* (2019.01)
*G01C 21/36* (2006.01)
*G06F 3/0482* (2013.01)

(52) U.S. Cl.
CPC ............ *G06T 17/00* (2013.01); *G06N 20/00* (2019.01); *G06T 11/60* (2013.01); *G01C 21/3635* (2013.01); *G06F 3/0482* (2013.01); *G06T 2200/24* (2013.01)

(58) Field of Classification Search
None
See application file for complete search history.

(56) References Cited

U.S. PATENT DOCUMENTS

| 9,118,903 | B2 | 8/2015 | Jiang et al. |
| 9,177,410 | B2 | 11/2015 | Mandel et al. |
| 9,407,904 | B2 | 8/2016 | Sandrew et al. |
| 9,665,906 | B2 | 5/2017 | Adeyoola et al. |
| 10,297,070 | B1 * | 5/2019 | Zhu .................... G06T 17/00 |
| 2009/0144173 | A1 | 6/2009 | Mo et al. |
| 2009/0144622 | A1 * | 6/2009 | Evans ................ G01C 21/00 715/706 |

(Continued)

FOREIGN PATENT DOCUMENTS

WO 2018052665 A1 3/2018

OTHER PUBLICATIONS

"3D Reconstruction From Multiple Images" https://www.cse.iitk.ac.in/users/amit/courses/768/00/sray/#Max%20Flow.

*Primary Examiner* — Anh-Tuan V Nguyen
(74) *Attorney, Agent, or Firm* — American Honda Motor Co., Inc.; Suzanne B. Gagnon

(57) ABSTRACT

An electronic system for a vehicle includes a memory and a control circuitry. The memory stores a three-dimensional (3D) model associated with the vehicle. The 3D model is a trained machine learning (ML) model that is trained using a first set of two-dimensional (2D) images as training data associated with the vehicle. The control circuitry receives a user input to display user-assistive information associated with the vehicle. The control circuitry generates a visual representation that corresponds to at least one of a first view of the vehicle or a second view of a component of the vehicle, based on the stored 3D model. The generated visual representation is different from the first set of 2D images. The control circuitry controls display of the user-assistive information that includes the generated visual representation on a display screen of the vehicle.

18 Claims, 9 Drawing Sheets

(56) References Cited

U.S. PATENT DOCUMENTS

| | | | |
|---|---|---|---|
| 2011/0043540 A1 | 2/2011 | Fancher et al. | |
| 2011/0119614 A1* | 5/2011 | Powell | G06F 16/435 |
| | | | 715/771 |
| 2012/0169931 A1* | 7/2012 | Mohapatra | G06F 9/4401 |
| | | | 348/563 |
| 2015/0235399 A1* | 8/2015 | Shechtman | G06T 5/005 |
| | | | 345/639 |
| 2015/0254719 A1* | 9/2015 | Barfield, Jr. | G06Q 30/0273 |
| | | | 705/14.53 |
| 2015/0363971 A1* | 12/2015 | Pan | G06T 17/00 |
| | | | 345/420 |
| 2016/0335795 A1* | 11/2016 | Flynn | G06K 9/6272 |
| 2017/0169620 A1* | 6/2017 | Bleiweiss | G06K 9/00201 |
| 2017/0221229 A1* | 8/2017 | Perrier | G06Q 30/0641 |
| 2018/0039848 A1* | 2/2018 | Konolige | G06T 7/75 |
| 2018/0234671 A1* | 8/2018 | Yang | G06K 9/6256 |
| 2018/0268255 A1* | 9/2018 | Surazhsky | G06N 3/0454 |
| 2018/0336580 A1* | 11/2018 | Kato | G06Q 30/0202 |
| 2019/0012575 A1* | 1/2019 | Xiao | G06N 5/04 |
| 2019/0026958 A1* | 1/2019 | Gausebeck | G06T 19/20 |
| 2019/0043243 A1* | 2/2019 | Chui | G06K 9/00201 |
| 2019/0147642 A1* | 5/2019 | Cole | G06K 9/00268 |
| | | | 345/419 |
| 2019/0180084 A1* | 6/2019 | Bouaziz | G06T 17/20 |
| 2019/0205667 A1* | 7/2019 | Avidan | G06N 3/0454 |
| 2019/0289273 A1* | 9/2019 | Mabuchi | G06K 9/6255 |
| 2019/0370617 A1* | 12/2019 | Singh | G06N 20/00 |
| 2019/0370666 A1* | 12/2019 | Ros Sanchez | G06T 5/50 |
| 2019/0384964 A1* | 12/2019 | Ando | G06K 9/00208 |

* cited by examiner

SYSTEM AND METHOD FOR DISPLAY OF VISUAL REPRESENTATIONS OF VEHICLE ASSOCIATED INFORMATION BASED ON THREE DIMENSIONAL MODEL

BACKGROUND

Many new technologies for automotive vehicles are being developed to improve driving experiences. In certain scenarios, a vehicle may include an infotainment system that may display a plurality of images of the vehicle and/or vehicle components. In such cases, the infotainment system may include a memory that stores a collection of images of the vehicle and/or the vehicle components. The collection of images may only depict a limited number of views of the vehicle and/or vehicle components. A user of the vehicle may wish to see a view of the vehicle and/or vehicle components for which images may not be stored in the memory. Also, it may not be feasible to store images of all the possible views of the vehicle and/or vehicle components as the storage size may be limited for the vehicle.

SUMMARY

An exemplary aspect of the disclosure provides an electronic system for a vehicle. The electronic system may include a memory configured to store a three-dimensional (3D) model associated with the vehicle. The 3D model may be a trained machine learning (ML) model that may be trained using a first set of two-dimensional (2D) images as training data associated with the vehicle. The electronic system may further include control circuitry configured to receive a user input to display user-assistive information associated with the vehicle. In response to the received user input, the control circuitry may be further configured to generate a visual representation that corresponds to at least one of a first view of the vehicle or a second view of a component of the vehicle. The visual representation may be generated based on the stored 3D model. The generated visual representation may be different from the first set of 2D images. The control circuitry may be further configured to control display of the user-assistive information that includes the generated visual representation on a display screen in the vehicle.

Another exemplary aspect of the disclosure provides a vehicle that may include a memory configured to store a three-dimensional (3D) model associated with the vehicle. The 3D model may be a trained machine learning (ML) model that may be trained using a first set of two-dimensional (2D) images as training data. The vehicle may further include control circuitry configured to receive a user input to display user-assistive information. In response to the received user input, the control circuitry may be further configured to generate a visual representation that corresponds to at least one of a first view or a second view different from a first view. The visual representation may be generated based on the stored 3D model. The generated visual representation may be different from the first set of 2D images. The control circuitry may be further configured to control display of the user-assistive information that comprises the generated visual representation on a display screen of the vehicle.

A method for a vehicle is provided. The method is included and implemented in an electronic device. The method includes storing a three-dimensional (3D) model associated with the vehicle. The 3D model may be a trained machine learning (ML) model that may be trained using a first set of two-dimensional (2D) images as training data associated with the vehicle. The method further includes receiving a user input for a display of user-assistive information associated with the vehicle. The method further includes generating a visual representation that corresponds to at least one of a first view of the vehicle or a second view of a component of the vehicle, in response to the received user input. The visual representation may be generated based on the stored 3D model. The generated visual representation may be different from the first set of 2D images. The method further includes controlling the display of the user-assistive information that includes the generated visual representation on a display screen in the vehicle.

DETAILED DESCRIPTION

Various embodiments of the present disclosure may be found in an electronic system for a vehicle. The disclosed electronic system includes a memory and control circuitry. The disclosed electronic system provides a solution to generate a visual representation associated with the vehicle based on only a stored three-dimensional (3D) model associated with the vehicle. The stored 3D model may be a trained machine learning (ML) model that is trained using a first set of two-dimensional (2D) images associated with the vehicle as training data. The first set of 2D images may correspond to only a finite number of views of the vehicle. Conventionally, due to a limitation on a capacity of the in-vehicle memory, only a few images with a limited number of views associated with the vehicle can be stored and made accessible to the user. On the contrary, the stored 3D model acts as a generalized model that may be used to generate different visual representations (such as 2D images) associated with the vehicle, where each image may depict a view that is different from the views available in the training data.

Also, in response to a user input, the disclosed electronic system may be configured to generate and control display devices to display such different representations on the fly. Thus, the present disclosure removes a need to physically store images that depict all the possible views associated with the vehicle. Instead, the present disclosure provides a solution to store the 3D model and further use the stored 3D model to generate any user-preferred view of the vehicle or a component of the vehicle. Also, without a need to store all the possible images, only the 3D model may be stored in a memory of the electronic system. This may lead to a reduced utilization of an available storage capacity in the electronic system and further provide an ease to the user to access a desired view of the vehicle or the component of the vehicle.

Figure 1:
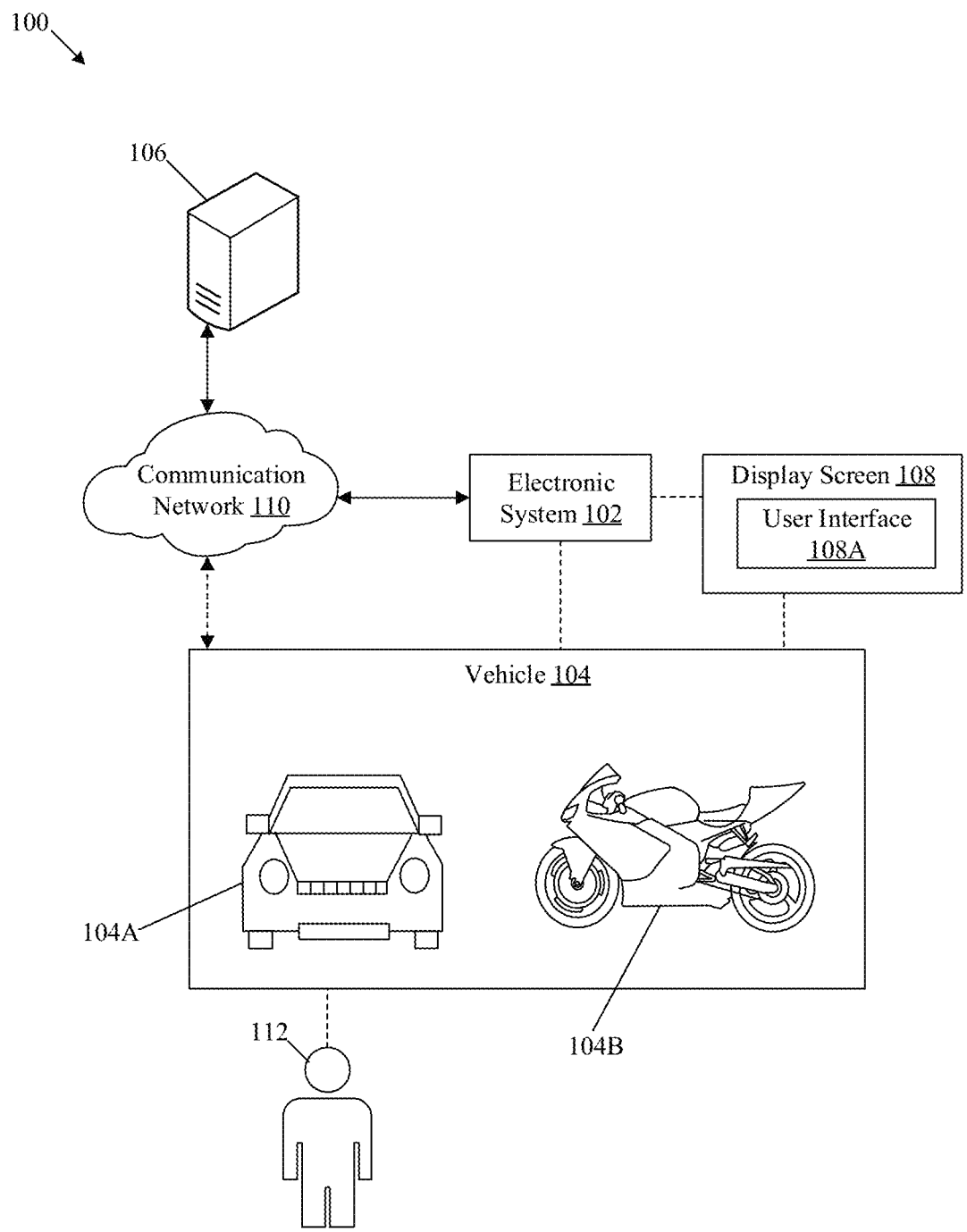
FIG. 1 is a block diagram that illustrates an exemplary network environment for an electronic system for a vehicle, in accordance with an embodiment of the disclosure.

FIG. 1 is a block diagram that illustrates an exemplary network environment for an electronic system for a vehicle, in accordance with an embodiment of the disclosure. With reference to FIG. 1, there is shown a network environment 100. The network environment 100 may include an electronic system 102, a vehicle 104, a server 106, and a display screen 108. The electronic system 102, the vehicle 104, and the server 106 may be communicatively coupled to each other, via a communication network 110. The electronic system 102 and the display screen 108 may be a component (e.g., a modular, detachable, or a fixed component) of the vehicle 104. The electronic system 102 and the display screen 108 are shown separately in FIG. 1; however, in some embodiments, the display screen 108 may be integrated with the electronic system 102.

The electronic system 102 may comprise suitable logic, circuitry, and interfaces that may be configured to control display of user-assistive information associated with the vehicle 104. The user-assistive information may be displayed in response to reception of a user input by the electronic system 102. The electronic system 102 may be further configured to generate a visual representation that corresponds to a first view of the vehicle 104 or a second view of a component of the vehicle 104. Examples of the component of the vehicle 104 may include, but are not limited to, doors, windows, engine, battery, hood, infotainment system, trunk, seats, rear view mirrors, headlights, taillights, wheels, and other vehicle components. Examples of the electronic system 102 may include, but are not limited to, a vehicle control system, an in-vehicle infotainment (IVI) system, an in-car entertainment (ICE) system, an automotive head-up display (HUD), an automotive dashboard, an embedded device, a smartphone, a human-machine interface (HMI), a computer workstation, a handheld computer, a cellular/mobile phone, a portable consumer electronic (CE) device, a server, and other computing devices.

The vehicle 104 may comprise suitable logic, circuitry, and interfaces that may be configured to control the display of the user-assistive information associated with the vehicle 104 to a user, such as the user 112. The vehicle 104 may communicate directly with the electronic system 102 or via the communication network 110. The vehicle 104 may be further configured to communicate with the server 106 via the communication network 110. The vehicle 104 may be a non-autonomous, a semi-autonomous, or an autonomous vehicle. Examples of the vehicle 104 may include, but are not limited to, an electric vehicle, a hybrid vehicle, and/or a vehicle that uses a combination of one or more distinct renewable or non-renewable power sources. A vehicle that uses renewable or non-renewable power sources may include a fossil fuel-based vehicle, an electric propulsion-based vehicle, a hydrogen fuel-based vehicle, a solar-powered vehicle, and/or a vehicle powered by other forms of alternative energy sources. As an example, the vehicle 104 may be a car 104A or a motorcycle 104B (as shown in FIG. 1).

The server 106 may comprise suitable logic, circuitry, and interfaces that may be configured to generate a three-dimensional (3D) model associated with the vehicle 104. The 3D model may be a trained machine learning (ML) model. The server 106 may be further configured to store a first set of 2D images associated with the vehicle 104. The first set of 2D images may be utilized as training data to generate the 3D model. The server 106 may be configured to communicate with each of the electronic system 102 and the vehicle 104, via the communication network 110. In some embodiments, the server 106 may be implemented as a cloud server, which may be utilized to execute various operations through web applications, cloud applications, HTTP requests, repository operations, file transfer, gaming operations, and the like. Examples of the server 106 may include, but are not limited to, an application server, a cloud server, a web server, a database server, a file server, a mainframe server, or a combination thereof.

The display screen 108 may comprise suitable logic, circuitry, and interfaces that may be configured to display the user-assistive information associated with the vehicle 104. The display screen 108 may render a user interface (UI) 108A that may include a plurality of UI elements. In some embodiments, the display screen 108 may be a touch screen, which may enable the user 112 to provide a touch input via the display screen 108. The touch screen may be at least one of a resistive touch screen, a capacitive touch screen, or a thermal touch screen. Examples of implementation of the display screen 108 may include, but are not limited to, a liquid crystal display (LCD) screen, and a light emitting diode (LED) screen, a plasma display screen, and an organic LED (OLED) display screen, and other display screens. In accordance with an embodiment, the display screen 108 may refer to a display screen of an augmented reality (AR)/ virtual reality (VR) device, a see-through display screen, a projection-based display screen, an electro-chromic display screen, and/or a transparent display screen. An example of the UI 108A is a graphical user interface (GUI).

The communication network 110 may include a communication medium through which the electronic system 102, the vehicle 104, and the server 106 may communicate with each other. Examples of the communication network 110 may include, but are not limited to, Internet, a cloud network, a Long Term Evolution (LTE) network, a Wireless Local Area Network (WLAN), a Local Area Network (LAN), a telephone line (POTS), and/or a Metropolitan Area Network (MAN). Various devices in the network environment 100 may be configured to connect to the communication network 110, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, Bluetooth (BT) communication protocols, or a combination thereof.

In some embodiments, the communication network 110 may be established to facilitate the different internal and peripheral electronic components of the vehicle 104 to communicate further with different types of vehicle servers or external communication devices, such as on-road beacons, on-road electronic displays, and mobile devices registered on the communication network 110. In such cases, the communication network 110 may be established based on wireless communication standard/protocols, such as Controller Area Network (CAN) protocols, Local Interconnect Network (LIN) protocol, Media Oriented Systems Transport (MOST) protocol, Vehicle Area Network (VAN), and FlexRay standard.

In operation, a 3D model of the vehicle 104 may be generated by training an untrained ML model on training data in a training stage. The training data may include a first set of 2D images associated with the vehicle 104. The server 106 may be configured to receive the first set of 2D images associated with the vehicle 104 as the training data. In some embodiments, the first set of 2D images may be pre-stored on the server 106. The first set of 2D images may depict a defined number of views associated with the vehicle 104 and/or one or more features of the vehicle 104. The one or more features of the vehicle 104 may be information that depicts one or more distinct characteristics or functions of the vehicle 104. For example, the one or more features may include safety features of the vehicle 104, airbag positions in vicinity of front and rear seats of the vehicle 104, a function of an anti-lock brake system (ABS) of the vehicle 104, or safety belts of the vehicle 104. Additionally, the one or more features of the vehicle 104 may include entertainment features that may include, for example, user-end features of an infotainment system of the vehicle 104, a stereo system of the vehicle 104, or a rear seat entertainment system of the vehicle 104. As an example, the defined number of views associated with the vehicle 104 may include a front view of the vehicle 104, a side view of the vehicle 104, a top view of the vehicle 104, a bottom view of the vehicle 104, a back view of the vehicle 104, and the like.

The server 106 may be further configured to train the untrained ML model based the received training data. More specifically, the server 106 may be configured to train the untrained ML model on the received first set of 2D images based on one or more ML learning techniques. The one or more ML learning techniques may include a supervised learning technique, an unsupervised learning technique, or a combination thereof. Example of the one or more ML learning techniques may include, but are not limited to, linear regression, logistic regression, Decision Tree, Support Vector Machine (SVM), Naive Bayes, k-Nearest Neighbor (kNN), K-Means, Random Forest, Dimensionality Reduction, and Gradient Boosting techniques. The untrained ML model may be a mathematical model that may be represented by a plurality of mathematical vector equations. In accordance with an embodiment, the untrained ML model 408 may be an artificial neural network (ANN) model or a deep neural network (DNN) model, such as a convolutional neural network (CNN) model or a recurrent neural network (RNN) model.

In some embodiments, instead of the server 106, the electronic system 102 may be configured to receive the first set of 2D images associated with the vehicle 104 as the training data. The electronic system 102 may be further configured to train the untrained ML model based on the received training data. The electronic system 102 may be further configured to generate the 3D model of the vehicle 104 by training the untrained ML model on the training data.

In a deployment stage, the electronic system 102 may be configured to store the 3D model associated with the vehicle 104. The 3D model may be a trained ML model that may be trained using the first set of 2D images as the training data.

In some embodiments, the electronic system 102 may be configured to update the stored 3D model based on supplemental information received from the server 106. The supplemental information may include information associated with a current state of the vehicle 104 or a current state of the component of the vehicle 104. For example, based on a regular use of the vehicle 104, there may be wear and tear of the engine of the vehicle 104. Due to the wear and tear, an appearance and/or different functional parameters of the engine may vary from a state depicted in a 2D image that may be used to generate the stored 3D model. In such cases, the electronic system 102 may be configured to update the stored 3D model to include a 2D image that depicts a current state of the engine of the vehicle 104.

The electronic system 102 may receive a user input from the user 112 to display the user-assistive information associated with the vehicle 104. The user-assistive information may include information requested to be displayed on the display screen 108 by the user 112. For example, the user-assistive information may include owner's manual of the vehicle 104, information associated with a vehicle entertainment system, climate information, navigation information, timing information, and the like. For example, a user request may be received in the form of a user input to view an image of an area below a hood cover of the vehicle 104, such as the car 104A. The user input may be received as a touch input, a gesture input, a voice input, and the like.

In accordance with an embodiment, the electronic system 102 may be configured to determine whether there is a presence or absence of view information associated with the vehicle 104, in the received user input. The view information may be information associated with at least a first view of the vehicle 104 or a second view of a component of the vehicle 104. Also, the view information may be indicative of a user preference for the first view of the vehicle 104 or the second view of the component of the vehicle 104. The first view or the second view may be indicative of a viewing plane based on which the vehicle 104 or the component of the vehicle 104 may be projected and further displayed on the display screen 108. The viewing plane may be selected by the electronic system 102 based on the user input.

The electronic system 102 may be configured to select the first view of the vehicle 104 for the visual representation based on the presence of the view information in the received user input. The first view of the vehicle 104 may be a default first view of the vehicle 104 when the view information is absent in the received user input. The electronic system 102 may be configured to select the second view of the component of the vehicle 104 for the visual representation based on the presence of the view information in the received user input. The second view of the component of the vehicle 104 may be a default second view of the component of the vehicle 104 when the view information is absent in the received user input. For example, the user input may be associated with a request to display a specification of a particular component of the vehicle 104. The specification may include details of the particular component and the default second view of the vehicle 104.

The electronic system 102 may be further configured to generate the visual representation in response to the received user input. The visual representation may be generated based on the stored 3D model. The visual representation may correspond to the first view of the vehicle 104 or the second view of the component of the vehicle 104. The generated visual representation may be different from the first set of 2D images. Alternatively stated, the first view of the vehicle 104 or the second view of the component of the vehicle 104 in the generated visual representation may be different from the defined number of views associated with the vehicle 104 in the first set of 2D images (i.e. the training data). As an example, the generated visual representation may be a 2D image (i.e. a 2D visual representation) of the vehicle 104 or the component of the vehicle 104. As another example, the generated visual representation may be a 3D graphical model of the vehicle 104.

In accordance with an embodiment, the electronic system 102 may be configured to store specification information associated with the vehicle 104. The specification information may include model identification information, dimensional information, color information, or information associated with a plurality of components of the vehicle 104. The stored specification information may further include color information, function specific information, or other information associated with each component of the plurality of components of the vehicle 104. The electronic system 102 may be configured to retrieve, from the stored specification information, a portion of the specification information associated with the generated visual representation. The electronic system 102 may be further configured to overlay the retrieved portion of the specification information on the generated visual representation. As an example, a 2D visual representation of the vehicle 104 from a side view may be overlaid with labels of different components, such as windows, door locks, side view mirrors, and indicator lights, of the vehicle 104.

In an output stage, electronic system 102 may be configured to control display of the user-assistive information on the display screen 108. The user-assistive information may include the generated visual representation associated with the first view of the vehicle 104 or the second view of the component of the vehicle 104. In some embodiments, the electronic system 102 may be configured to control the display of the user-assistive information that may include the generated visual representation and the retrieved portion of the specification information associated with the generated visual representation. For example, the electronic system 102 may be configured to control the display of a visual representation of an engine of the car 104A and further control the display of the portion of the specification information associated with the engine of the car 104A.

In accordance with an embodiment, the electronic system 102 may be configured to display the UI 108A onto the display screen 108. The user-assistive information may be displayed on the UI 108A. The electronic system 102 may be further configured to enable a set of UI options on the UI 108A. The user 112 may interact with the electronic system 102 through a user selection of a first UI option of the set of UI options on the display screen 108. Alternatively stated, the user selection of the first UI option may act as a user input for the electronic system 102 and may further enable a user interaction with the electronic system 102. The set of UI options may include buttons, gestures, widgets, or other graphical or non-graphical UI options. The electronic system 102 may be configured to receive the user input corresponding to the user selection of the first UI option of the enabled set of UI options. The electronic system 102 may be further configured to update the user-assistive information on the display screen 108, based on the selection of the first UI option. For example, the user assistive information displayed on the display screen 108 may include the visual representation of a hood of the car 104A and the portion of the specification information associated with the hood of the car 104A. The electronic system 102 may be configured to receive a user input that corresponds to a gesture input to view an interior portion of the hood of the car 104A. In such cases, the electronic system 102 may be configured to update the user-assistive information on the display screen 108 to display the interior portion of the hood of the car 104A, based on the selection of the first UI option. An example of a UI-based update of the user-assistive information is shown in FIGS. 5A, 5B, 6A, and 6B.

In accordance with an embodiment, the electronic system 102 may be configured to generate a plurality of visual representations that correspond to at least a first plurality of views of the vehicle 104 or a second plurality of views of the component of the vehicle 104. The electronic system 102 may be configured to control the display of the user-assistive information based on the user input. The electronic system 102 may be further configured to control the display of the generated plurality of visual representations for a seamless navigation through the first plurality of views of the vehicle 104 or the second plurality of views of the component of the vehicle 104. More specifically, the plurality of visual representations may be displayed such that a view of the vehicle 104 or the component of the vehicle 104 may appear to change seamlessly as the user input changes with time. For example, the user input may be a swiping action to the left of the display screen 108. The electronic system 102 may be configured to transform the swiping action into a sequence of viewing planes. The plurality of visual representations may be generated to match views that correspond to the sequence of viewing planes.

The electronic system 102 may enable the user 112 to seamlessly navigate through the generated plurality of visual representations by using the set of UI options on the display screen 108. For example, the user 112 may swipe through a first visual representation displayed on the display screen 108 and the electronic system 102 may be configured to control the display of successive visual representations of the generated plurality of visual representations, in response to a swiping action of the user 112.

In accordance with an embodiment, the electronic system 102 may be configured to render a 3D graphical model of at least the vehicle 104 or the component of the vehicle 104 on the display screen 108, based on the stored 3D model. The 3D graphical model may be a 3D vector representation of the vehicle 104 or the component of the vehicle 104. The rendered 3D graphical model may be a representation of a body of the vehicle 104 or the component of the vehicle 104 by using a collection of points in a 3D space. The generated visual representation may include the rendered 3D graphical model of at least the first view of the vehicle 104 or the second view of the component of the vehicle 104. For example, a 3D graphical model of the front portion of the car 104A may be displayed on the display screen 108.

Figure 2:
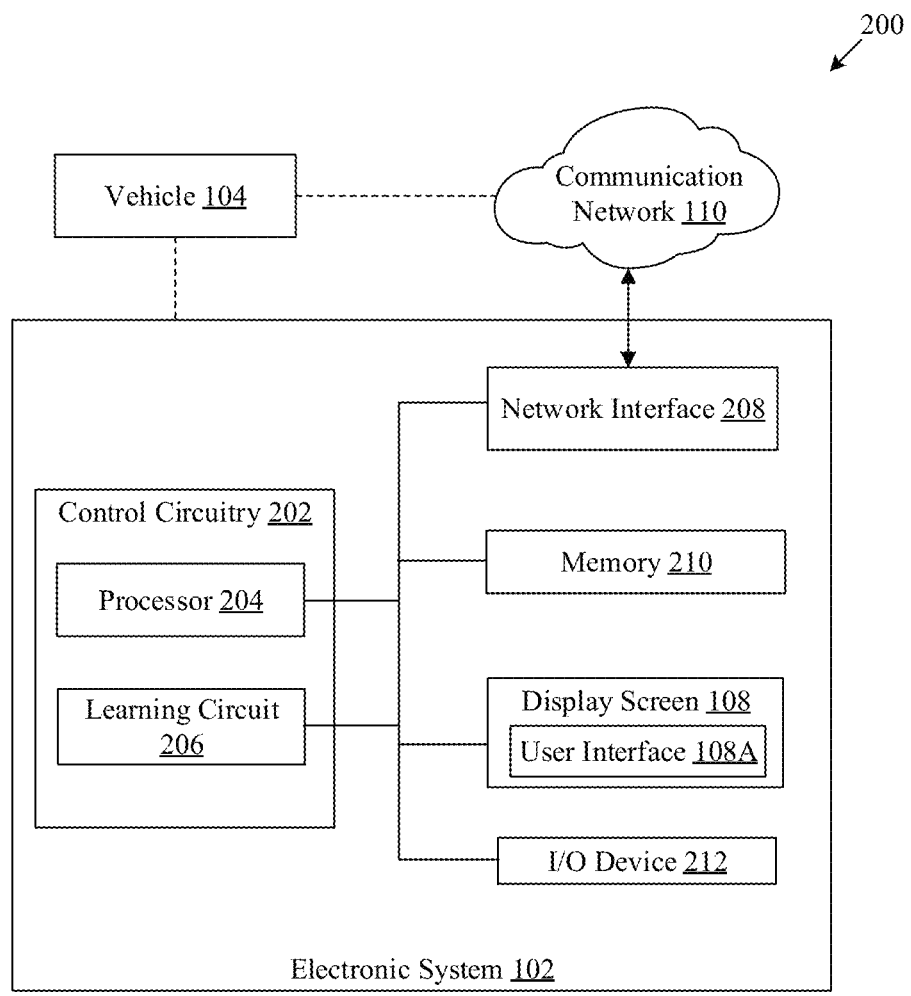
FIG. 2 is a block diagram that illustrates an exemplary electronic system for a vehicle, in accordance with an embodiment of the disclosure.

FIG. 2 is a block diagram that illustrates an exemplary electronic system for a vehicle, in accordance with an embodiment of the disclosure. FIG. 2 is explained in conjunction with elements from FIG. 1. With reference to FIG. 2, there is shown a block diagram 200 of the electronic system 102. The electronic system 102 may include control circuitry 202. The control circuitry 202 of the vehicle 104 is shown to be implemented as an electronic component of the electronic system 102, such as the in-vehicle infotainment system 310, of the vehicle 104. However, in some embodiments, the control circuitry 202 may also be implemented as a component of an engine control unit (ECU) of the vehicle 104, without a deviation from the scope of the present disclosure. The control circuitry 202 may include a processor 204 and a learning circuit 206. The electronic system 102 may further include a network interface 208, a memory 210, an input/output (I/O) device 212, and the display screen 108. The control circuitry 202 may be communicatively coupled with the network interface 208, the memory 210, the display screen 108, and the I/O device 212, via a set of communication ports/channels. There is also shown the vehicle 104 associated with the electronic system 102. The electronic system 102 may be integrated with the vehicle 104.

The processor 204 may comprise suitable logic, circuitry, and interfaces that may be configured to execute a set of instructions stored in the memory 210. The processor 204 may be further configured to process one or more user inputs and information associated with a user (such as the user 112) or a vehicle (such as the vehicle 104). The processor 204 may be further configured to communicate with different electronic components of the vehicle 104, via the network interface 208 and/or the I/O device 212. The processor 204 may be implemented based on a number of processor technologies known in the art. Examples of the processor 204 may include a Graphical Processing Unit (GPU), a Central Processing Unit (CPU), an x86-based processor, an x64-based processor, a Reduced Instruction Set Computing (RISC) processor, an Application-Specific Integrated Circuit (ASIC) processor, a Complex Instruction Set Computing (CISC) processor, and/or other hardware processors.

The learning circuit 206 may comprise suitable logic, circuitry, and interfaces that may be configured to train an untrained ML model based on training data associated with the vehicle 104. The training data associated with the vehicle 104 may include a first set of 2D images of the vehicle 104 that may correspond to a defined number of views associated with the vehicle 104 or one or more features of the vehicle 104. In some embodiments, the learning circuit 206 may be a specialized microprocessor (i.e. an Artificial Intelligence (AI) accelerator) that may be configured to accelerate the training of the untrained ML model. Examples of implementation of the learning circuit 206 may include, but are not limited to, a GPU, a CPU, an x86-based processor, an x64-based processor, a RISC processor, an ASIC processor, a CISC processor, and/or other hardware processors.

The network interface 208 may comprise suitable logic, circuitry, and interfaces that may be configured to enable a communication between the electronic system 102, the vehicle 104, and the server 106, via the communication network 110. The network interface 208 may be implemented by use of various known technologies to support wired or wireless communication of the electronic system 102 with the communication network 110. The network interface 208 may include, but is not limited to, an antenna, a frequency modulation (FM) transceiver, a radio frequency (RF) transceiver, one or more amplifiers, a tuner, one or more oscillators, a digital signal processor, a coder-decoder (CODEC) chipset, a subscriber identity module (SIM) card, and/or a local buffer. The network interface 208 may communicate via wireless communication with the communication network 110. The wireless communication may use any of a plurality of communication standards, protocols and technologies, such as Long Term Evolution (LTE), Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The memory 210 may comprise suitable logic, circuitry, and interfaces that may be configured to store the 3D model of the vehicle 104. The memory 210 may be configured to store the specification information and the supplemental information associated with the vehicle 104. The memory 210 may be further configured to store user data associated with the user 112. The user data may include, but not limited to, user identification information, user-preference information, and user driving pattern information. Examples of implementation of the memory 210 may include, but are not limited to, a Random Access Memory (RAM), a Read Only Memory (ROM), a Hard Disk Drive (HDD), a Solid-State Drive (SSD), a CPU cache, and/or a Secure Digital (SD) card.

The I/O device 212 may comprise suitable logic, circuitry, and interfaces that may be configured to receive an input from a user (such as the user 112) and provide an output to the user 112, based on the received input from the user 112. For example, the I/O device 212 may be utilized to receive the user input to display the user-assistive information associated with the vehicle 104. The I/O device 212 may include various input and output devices, which may be configured to communicate with the control circuitry 202. Examples of the I/O device 212 may include, but are not limited to, a touch screen, a keyboard, a mouse, a joystick, a microphone, a display screen (for example, the display screen 108), and a speaker.

In FIG. 2, the processor 204 and the learning circuit 206 are shown as separate computing circuits. However, in some embodiments, the control circuitry 202 may only include the processor 204 and the operations of the learning circuit 206 may be executed by the processor 204, without a deviation from the scope of the present disclosure. The operations of the control circuitry 202 is described in detail, for example, in FIGS. 4, 5A, 5B, 6A, 6B, and 7.

Figure 3:
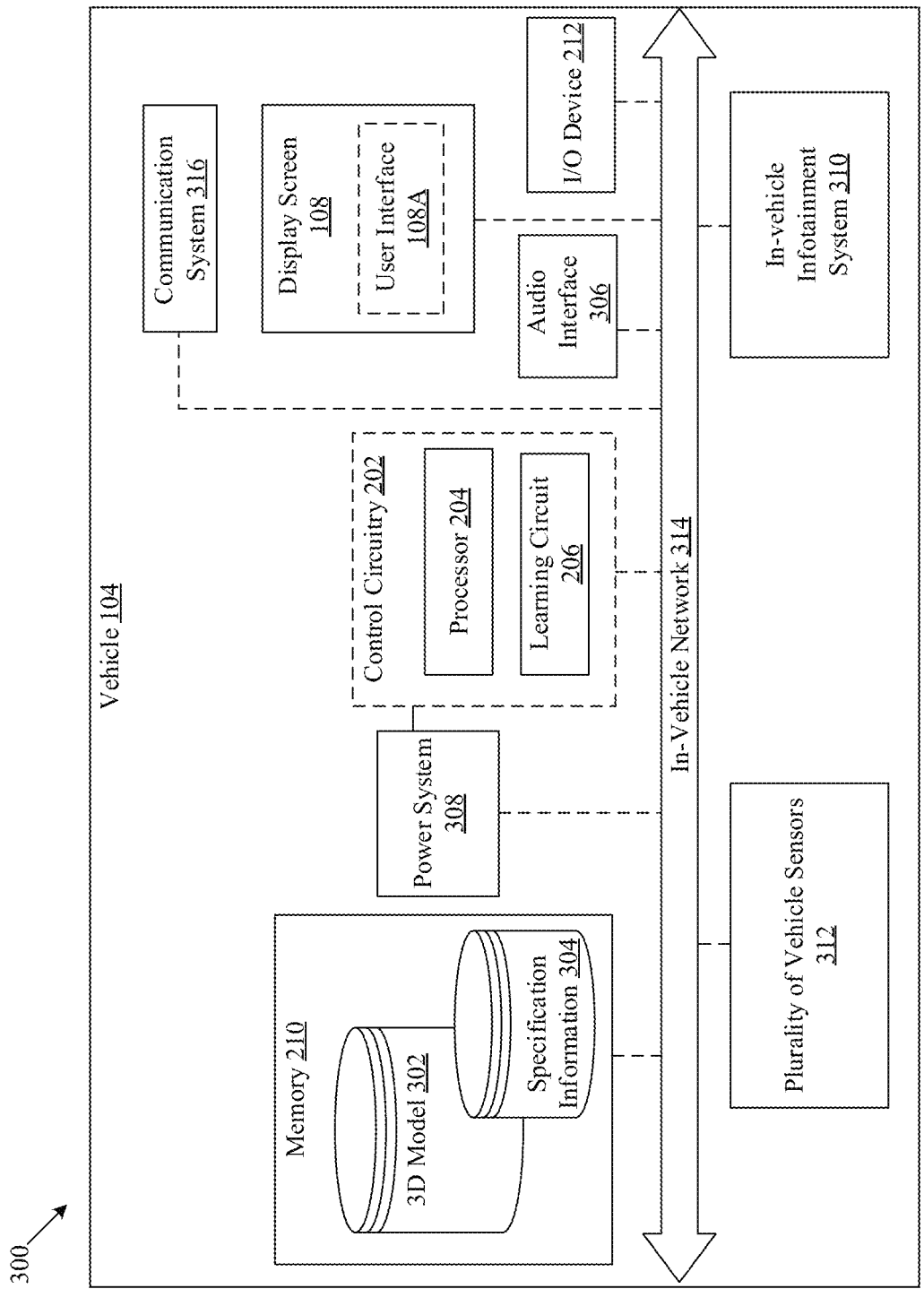
FIG. 3 is a block diagram that illustrates an exemplary vehicle for display of visual representations of vehicle associated information, in accordance with an embodiment of the disclosure.

FIG. 3 is a block diagram that illustrates an exemplary vehicle for display of visual representations of vehicle associated information, in accordance with an embodiment of the disclosure. FIG. 3 is explained in conjunction with elements from FIG. 1 and FIG. 2. With reference to FIG. 3, there is shown a block diagram 300 of the vehicle 104. The vehicle 104 may include the control circuitry 202 that includes the processor 204 and the learning circuit 206. The vehicle 104 may further include the memory 210, the display screen 108, and the I/O device 212. The memory 210 may be configured to store a 3D model 302 of the vehicle 104 and specification information 304 associated with the vehicle 104. The 3D model 302 may be the trained ML model that may be trained based on the training data. The 3D model 302 may be trained using a first set of 2D images as the training data. The specification information 304 may be information associated with the vehicle 104. The specification information 304 may include, but not limited to, model identification information, dimensional information, color information of the vehicle 104, or information associated with a plurality of components of the vehicle 104. The vehicle 104 may further include an audio interface 306, a power system 308, an in-vehicle infotainment system 310, a plurality of vehicle sensors 312, an in-vehicle network 314, and a communication system 316.

The audio interface 306 may comprise suitable logic, circuitry, and interfaces that may be configured to receive audio data from the user 112 or output audio data to the user 112. The audio interface 306 may also be connected to a microphone to receive the one or more user inputs (e.g., a voice instruction) from the user 112. The audio interface 306 may be connected to a speaker to produce an audio output for the user 112. The audio interface 306 may also be communicatively coupled to the control circuitry 202.

The power system 308 may comprise suitable logic, circuitry, and interfaces that may be configured to control charging states and discharging states of a battery of the vehicle 104. The power system 308 may be further configured to control the transfer of electric energy between the battery and the control circuitry 202 of the vehicle 104. Examples of the power system 308 may include, but are not limited to, a power electronic drive control system, an electric charge/discharge controller, a charge regulator, a battery regulator, a battery management system, an electric circuit breaker, or an application-specific microprocessor.

The in-vehicle infotainment system 310 may comprise suitable logic, circuitry, and interfaces that may be configured to present at least audio-based data, video-based data, or a user interface (UI) of the vehicle 104. Examples of the in-vehicle infotainment system 310 may include, but are not limited to, an entertainment system, a navigation system, a vehicle user interface (UI) system, an Internet-enabled communication system, and other entertainment systems.

The plurality of vehicle sensors 312 may comprise suitable logic, circuitry, and interfaces that may be configured to acquire one or more vehicle parameters, such as a user occupancy in the vehicle 104, an ambient temperature around the battery of the vehicle 104, navigational information of the vehicle 104, and environmental information (such as temperature, humidity, $CO_2$ levels, etc.) ambient to the vehicle 104. The plurality of vehicle sensors 312 may be communicatively coupled to the processor 204. Examples of the plurality of vehicle sensors 312 may include, but are not limited to, a navigation sensor, an environmental sensor, and an image sensing device.

The in-vehicle network 314 may include a medium through which the control circuitry 202 may communicate with other components, such as the display screen 108, the input device 214, the power system 308, the plurality of vehicle sensors 312, and the communication system 316, of the vehicle 104. Various devices or components in the vehicle 104 may be configured to connect to the in-vehicle network 314, in accordance with various wired and wireless communication protocols. Examples of the wired and wireless communication protocols for the in-vehicle network 314 may include, but are not limited to, a vehicle area network (VAN), a CAN bus, Domestic Digital Bus (D2B), a Transmission Control Protocol and Internet Protocol (TCP/IP), Bluetooth (BT) communication protocol, Time-Triggered Protocol (TTP), FlexRay, IEEE 1394, Carrier Sense Multiple Access With Collision Detection (CSMA/CD) based data communication protocol, Inter-Integrated Circuit ($I^2C$), Inter Equipment Bus (IEBus), Society of Automotive Engineers (SAE) J1708, SAE J1939, International Organization for Standardization (ISO) 11992, ISO 11783, Media Oriented Systems Transport (MOST), MOST25, MOST50, MOST150, Plastic optical fiber (POF), Power-line communication (PLC), Serial Peripheral Interface (SPI) bus, and/or Local Interconnect Network (LIN).

The communication system 316 may comprise suitable logic, circuitry, and interfaces that may be configured to communicate data associated with the vehicle 104 to the server 106, via the communication network 110. The communication system 316 may be implemented by use of various known technologies to support wired or wireless communication of the vehicle 104 with the communication network 110. The communication system 316 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and a local buffer.

Figure 4:
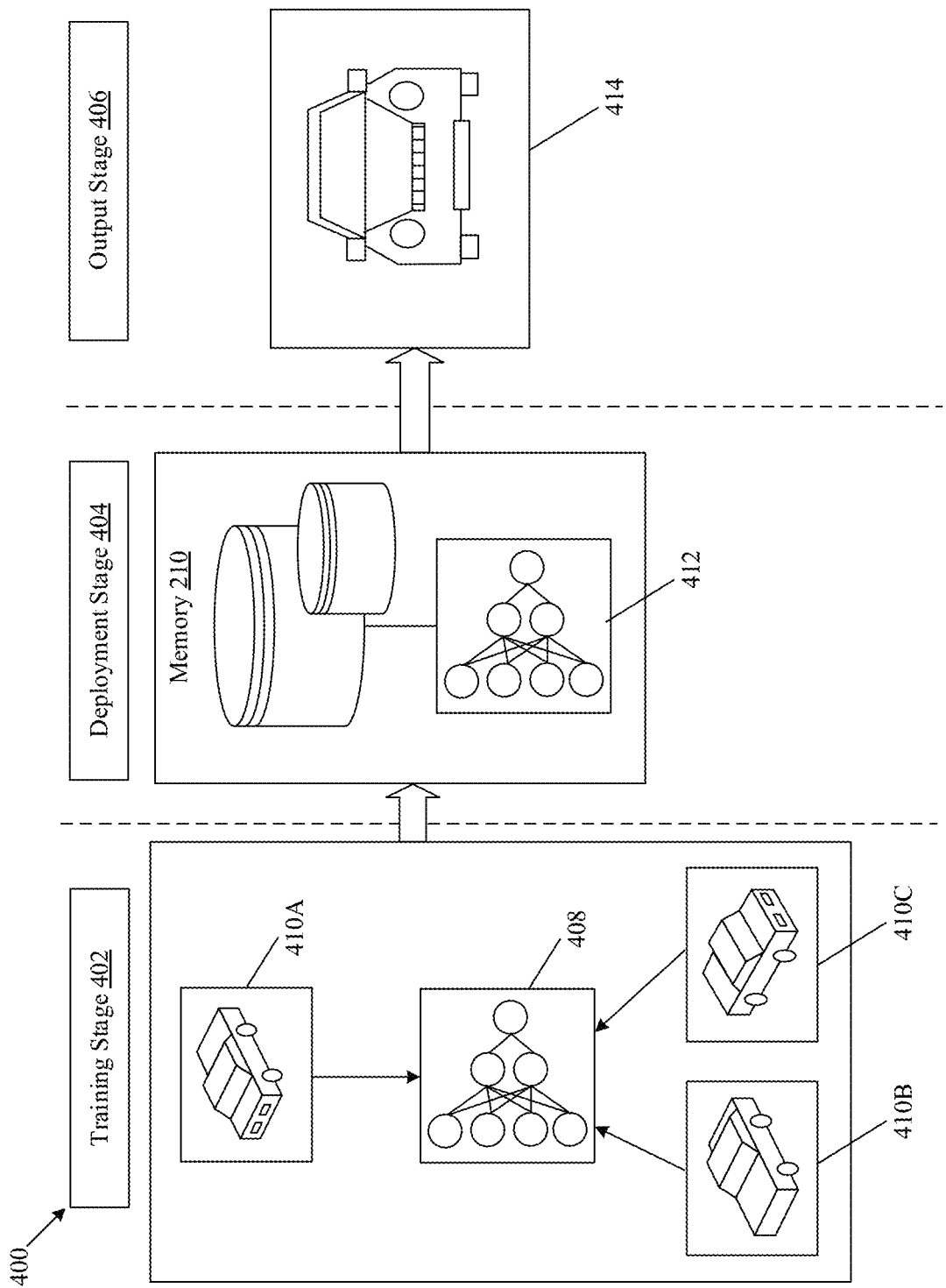
FIG. 4 illustrates an exemplary scenario for display of visual representations of vehicle associated information, in accordance with an embodiment of the disclosure.

FIG. 4 illustrates an exemplary scenario for display of visual representations of vehicle associated information, in accordance with an embodiment of the disclosure. FIG. 4 is explained in conjunction with elements from FIGS. 1, 2, and 3. With reference to FIG. 4, there is shown an exemplary scenario 400 that depicts different stages of operation of the electronic system 102 for generation and implementation of the 3D model. The different stages may include a training stage 402, a deployment stage 404, and an output stage 406.

In the training stage 402, there is shown an untrained ML model 408 and a first set of 2D images, such as a first 2D image 410A, a second 2D image 410B, and a third 2D image 410C. The first 2D image 410A, the second 2D image 410B, and the third 2D image 410C, may depict different views of the vehicle 104. The control circuitry 202 may be configured to receive the first set of 2D images, such as the first 2D image 410A, the second 2D image 410B, and the third 2D image 410C. The first 2D image 410A, the second 2D image 410B, and the third 2D image 410C may be the training data utilized to train the untrained ML model 408. The untrained ML model 408 may be a mathematical model that may be represented by a plurality of mathematical equations. In some embodiments, the untrained ML model 408 may be an artificial neural network (ANN) model or a deep neural network (DNN) model, such as a convolutional neural network (CNN) model or a recurrent neural network (RNN) model. The untrained ML model 408 may include a plurality of parameters, such as weight parameters, learning rate, and loss function.

The learning circuit 206 may be configured to train the untrained ML model 408 based on the first 2D image 410A, the second 2D image 410B, and the third 2D image 410C, by using a machine learning technique. Alternatively stated, the learning circuit 206 may be configured to iteratively adjust the plurality of parameters to a set of optimum values. The set of optimum values of the plurality of parameters may correspond to a minimization of the loss function for the untrained ML model 408 in the training stage 402. Examples of the machine learning technique that may be used to train the untrained ML model 408 may include, but are not limited to, linear regression, logistic regression, Decision Tree, Support Vector Machine (SVM), Naive Bayes, k-Nearest Neighbor (kNN), K-Means, Random Forest, Dimensionality Reduction, and Gradient Boosting techniques.

The learning circuit 206 may be configured to generate a trained ML model by training the untrained ML model 408, based on the first 2D image 410A, the second 2D image 410B, and the third 2D image 410C. In some embodiments, the untrained ML model 408 may be trained on the server 106 and further transferred to the electronic system 102 for storage in the memory 210 of the electronic system 102.

In the deployment stage 404, there is shown a 3D model 412. The 3D model 412 is the trained ML model that may be trained in the training stage 402 and is same as the 3D model 302, as described in FIG. 3. The control circuitry 202 may be configured to store the 3D model 412 in the memory 210 of the electronic system 102. In some embodiments, the control circuitry 202 may be configured to receive the 3D model 412 from the server 106 and may be configured to store the received 3D model 412 in the memory 210 of the vehicle 104. The stored 3D model 412 may take up less memory as compared to a plurality of 2D images that may represent a plurality of views associated with the vehicle 104 or components of the vehicle 104.

The control circuitry 202 may use the stored 3D model 412 to generate a plurality of visual representations associated with the plurality of views of the vehicle 104 or the component of the vehicle 104. Each visual representation of the plurality of visual representations may correspond to a different view of the vehicle 104 or the component of the vehicle 104. The different view may be generated based on a user input to the control circuitry 202. The memory 210 may be further configured to store the specification information associated with the vehicle 104. The specification information may include at least one of model identification information, dimensional information, color information of the vehicle 104, or information associated with a plurality of components of the vehicle 104.

In the output stage 406, there is shown a visual representation 414 of the vehicle 104. The control circuitry 202 may be configured to generate the visual representation 414 that corresponds to the first view associated with the vehicle 104. The visual representation 414 may be generated based on the stored 3D model 412 (i.e. the trained ML model). The first view associated with the vehicle 104 may be different from a defined number of views of the vehicle 104 in the first set of 2D images, i.e., the training data. Alternatively stated, the first view may be different from views of the vehicle 104 depicted in the first 2D image 410A, the second 2D image 410B, and the third 2D image 410C, respectively.

The visual representation 414 may be generated based on a user input from the user 112. In case the user input corresponds to a user request to see the first view of the vehicle 104, the control circuitry 202 may be configured to control display of user-assistive information that includes the generated visual representation 414, onto the display screen 108. For example, as shown in FIG. 4, the generated visual representation 414 corresponds a front view of the vehicle 104 that is different from the views of the vehicle 104 depicted in the first 2D image 410A, the second 2D image 410B, and the third 2D image 410C. In case the user input corresponds to a user request to see specification information of the vehicle 104, the control circuitry 202 may be further configured to retrieve, from the memory 210, a portion of the specification information associated with the generated visual representation 414. The control circuitry 202 may be further configured to overlay the retrieved portion of the specification information on the generated visual representation 414.

Figure 5A:
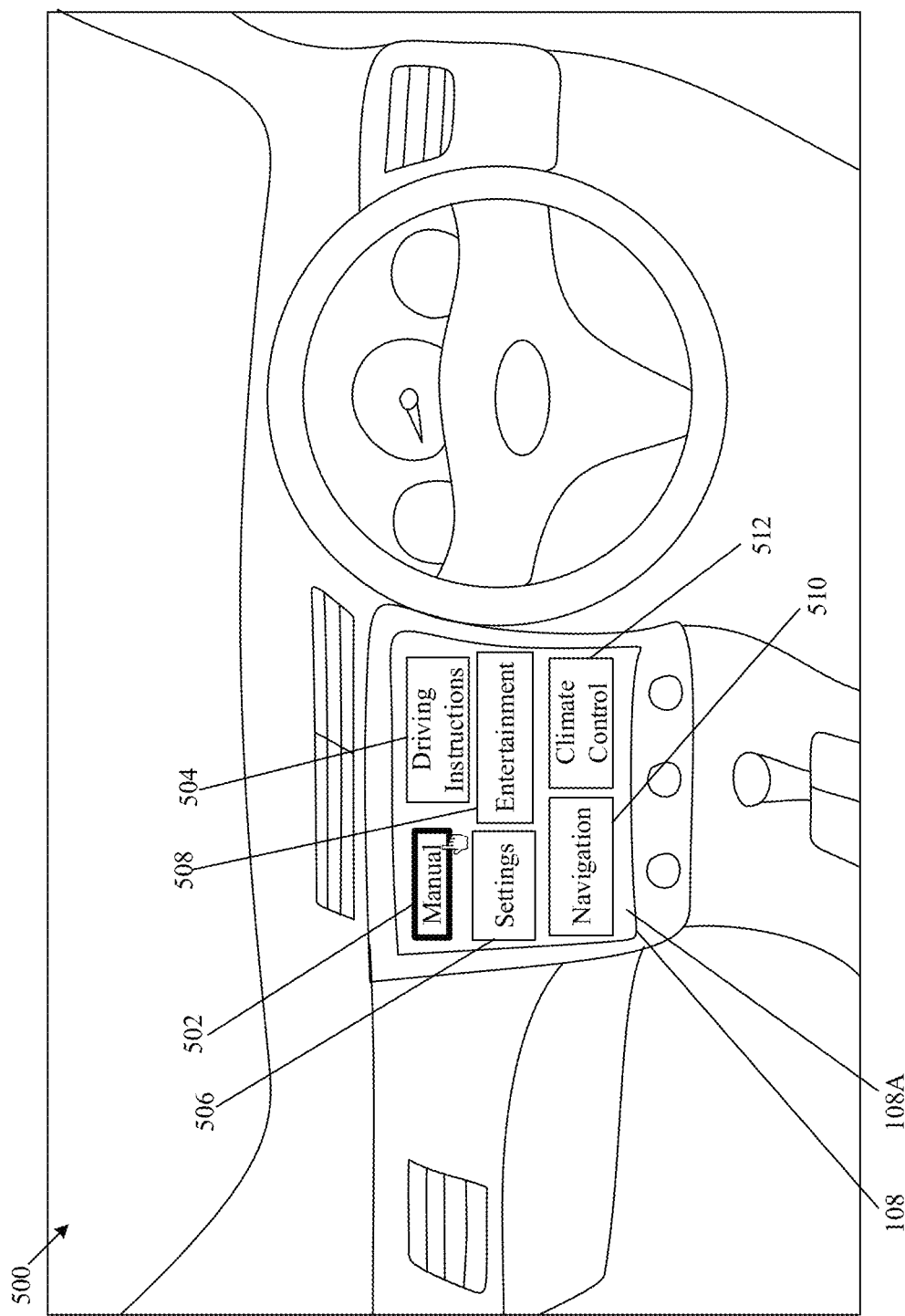
FIGS. 5A and 5B, collectively, illustrate an exemplary scenario of a user interface (UI) rendered on a display screen of a vehicle, in accordance with an embodiment of the disclosure.
Figure 5B:
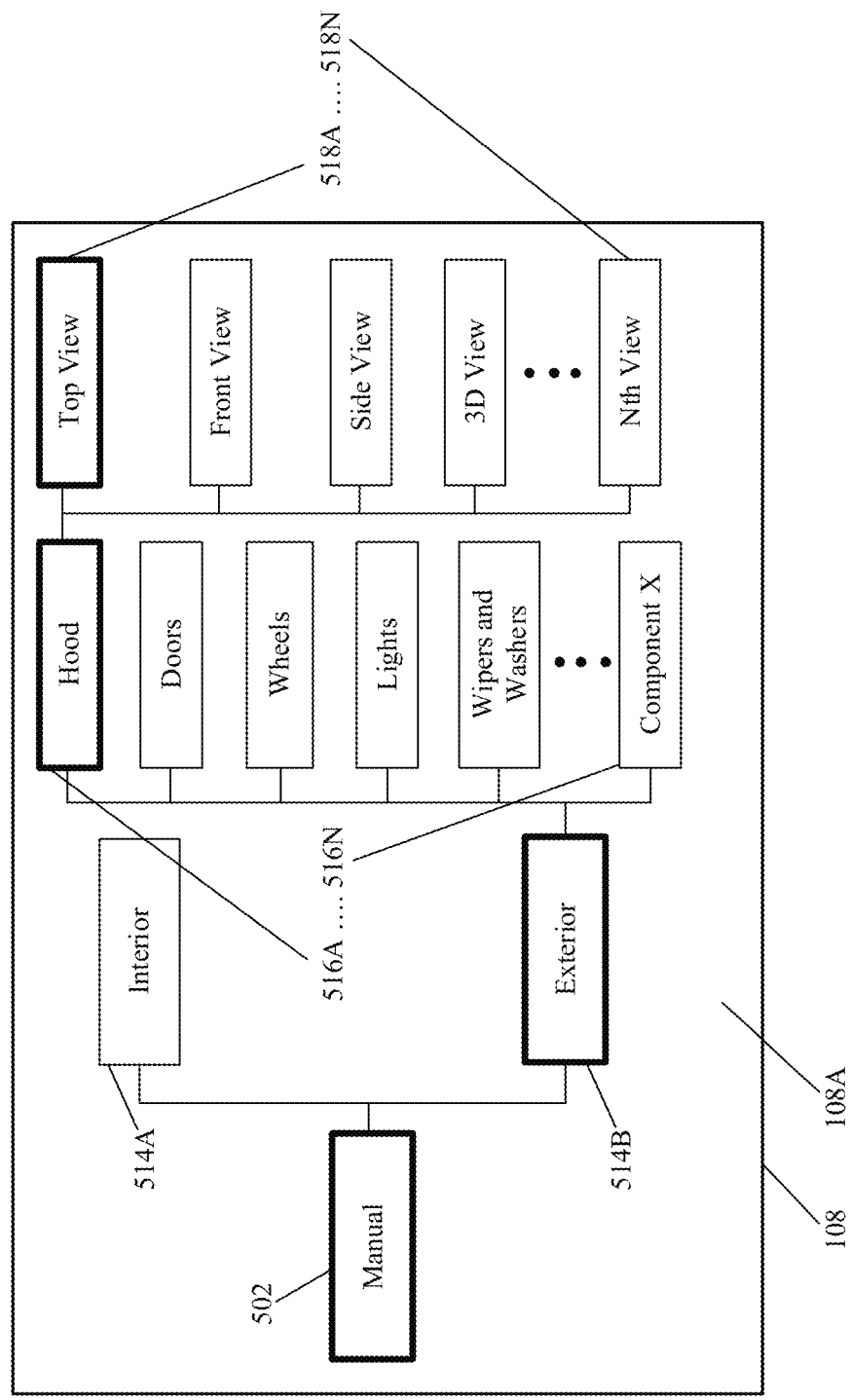

FIGS. 5A and 5B, collectively, illustrate an exemplary scenario of a user interface (UI) rendered on a display screen of a vehicle, in accordance with an embodiment of the disclosure. FIGS. 5A and 5B are explained in conjunction with elements from FIGS. 1, 2, 3, and 4. With reference to FIG. 5A, there is shown an interior view 500 of the vehicle 104. In the interior view 500, there is further shown the display screen 108 and the UI 108A on the display screen 108. The UI 108A includes a set of UI options 502, 504, 506, 508, 510, and 512. The display screen 108 may be a part of the electronic system 102. As shown, the electronic system 102 may be a part of the in-vehicle infotainment system 310 of the vehicle 104. However, in some embodiments, the display screen 108 and the electronic system 102 may be implemented as a heads-up display (HUD) of the vehicle 104.

The control circuitry 202 may be configured to display the UI 108A onto the display screen 108. The UI 108A may include the set of UI options 502, 504, 506, 508, 510, and 512. The set of UI options 502, 504, 506, 508, 510, and 512 may correspond to a set of UI elements based on which the user 112 may interact with the electronic system 102 and/or the vehicle 104. The interaction may be made as a user input to the control circuitry 202 to display user-assistive information onto the display screen 108. For example, the set of UI options 502, 504, 506, 508, 510, and 512 may be labelled as "Manual", "Driving Instructions", "Settings", "Entertainment", "Navigation", and "Climate Control". The control circuitry 202 may be configured to control the display of the user-assistive information on the display screen 108 based on a selection of a UI option of the set of UI options 502, 504, 506, 508, 510, and 512. The selection of the UI option may correspond to a user input to display the user-assistive information on the display screen 108.

For example, the control circuitry 202 may receive the user input based on a selection of a first UI option 502 of the set of UI options 502, 504, 506, 508, 510, and 512. The selection of the first UI option 502 may be associated with a request to look into an owner's manual for the vehicle 104. The owner's manual may be an instruction manual that may include a plurality of instructions, such as safety instructions, setup instructions, driving instructions, specification information, and operational information, associated with the operation of the vehicle 104. The owner's manual may further include a plurality of images that represent a plurality of views of the vehicle 104 or the components of the vehicle 104. The control circuitry 202 may be configured to update the user-assistive information on the display screen 108 based on the selection of the first UI option 502. The updated user-assistive information may include other UI options that may be displayed in response to the selection of the first UI option 502.

As shown in FIG. 5A, the set of UI options 502, 504, 506, 508, 510, and 512 may depict only few exemplary UI options. However, there may be other possible UI options for a user selection and the display of the user-assistive information on the display screen 108, without a deviation from the scope of the disclosure.

With reference to FIG. 5B, there is shown the display screen 108 and the UI 108A. In response to the received user input for the selection of the first UI option 502, the control circuitry 202 may be configured to update the user-assistive information displayed on the display screen 108. The user-assistive information may include an extended tree of a first set of UI options 514A and 514B, a second set of UI options 516A . . . 516N, and a third set of UI options 518A . . . 518N. For example, the first set of UI options 514A and 514B may be labelled as "Interior" and "Exterior", which may be associated with a selection of an interior portion or an exterior portion of the vehicle 104. The control circuitry 202 may receive a first user input that corresponds to a selection of a UI option 514B of the first of UI options 514A and 514B. The UI option 514B may be associated with the selection of the exterior portion of the vehicle 104. In response to the selection of the UI option 514B, the control circuitry 202 may be configured to update the second set of UI options 516A . . . 516N on the display screen 108. For example, the second set of UI options 516A . . . 516N may be labelled as "Hood", "Doors", "Wheels", "Lights", "Wipers and Washers", and a "Component X", which may be associated with the selection of a component in the exterior portion of the vehicle 104.

In accordance with an embodiment, the control circuitry 202 may receive a second user input that corresponds to a selection of a UI option 516A of the second set of UI options 516A . . . 516N. The UI option 516A may be associated with the selection of a hood portion of the vehicle 104. In response to the selection of the UI option 516A, the control circuitry 202 may be further configured to update the third set of UI options 518A . . . 518N on the display screen 108. For example, the third set of UI options 518A . . . 518N may be labelled as "Top View", "Front View", "Side View", 3D View", and "Nth View", which may be associated with the selection of a view from a plurality of views of the selected hood portion of the vehicle 104. The control circuitry 202 may receive a third user input that may correspond to a selection of a UI option 518A of the third set of UI options 518A . . . 518N. The UI option 518A may be associated with the selection of the top view of the hood portion of the vehicle 104.

The control circuitry 202 may be further configured to generate a visual representation that corresponds to the top view of the hood portion of the vehicle 104, based on the received user input. The control circuitry 202 may be further configured to update the user-assistive information on the display screen 108 that may include the generated visual representation. An example of the updated user-assistive information that includes the generated visual representation, is provided in FIGS. 6A and 6B.

As shown in FIG. 5B, the first set of UI options 514A and 514B, the second set of UI options 516A . . . 516N, and the third set of UI options 518A . . . 518N may depict only few exemplary UI options. However, there may be other possible UI options for the user selection and the display of the user-assistive information on the display screen 108, without a deviation from the scope of the disclosure.

Figure 6A:
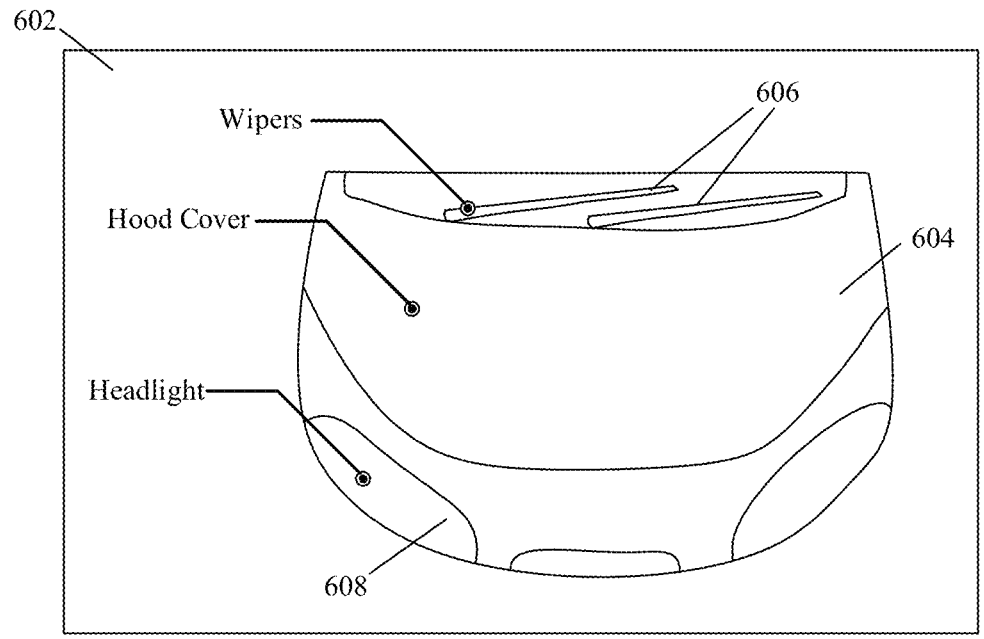
FIGS. 6A and 6B, collectively, illustrate an exemplary scenario for display of user-assistive information on a display screen, in accordance with an embodiment of the disclosure.
Figure 6B:
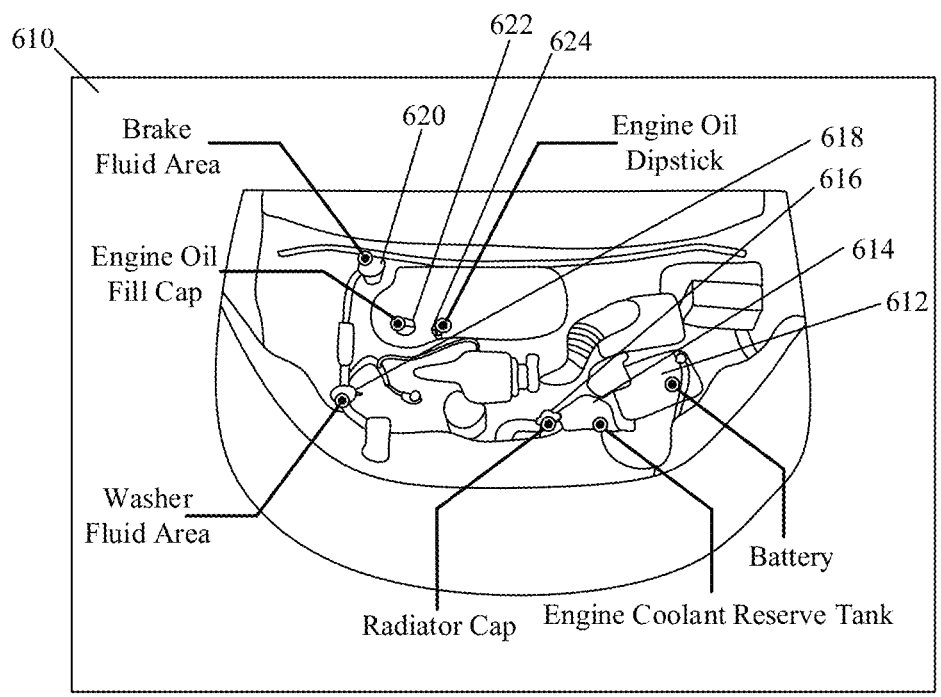

FIGS. 6A and 6B, collectively, illustrate an exemplary scenario for display of user-assistive information on a display screen, in accordance with an embodiment of the disclosure. FIGS. 6A and 6B are described in conjunction with elements from FIGS. 1, 2, 3, 4, 5A, and 5B. With reference to FIG. 6A, there is shown a visual representation 602 on the display screen 108. There is further shown a hood cover 604 of the vehicle 104, wipers 606 of the vehicle 104, and a headlight 608 of the vehicle 104. The hood cover 604, the wipers 606, and the headlight 608 may be components of the vehicle 104, as shown in FIG. 6A. The vehicle 104 may include the electronic system 102.

The control circuitry 202 may be configured to generate the visual representation 602, in response to the received user input to display the user-assistive information. For example, the received user input may be associated with a request to display the top view of the hood portion of the vehicle 104 (as described in FIG. 5B). The generated visual representation 602 may be a 2D image that may represent the top view of the hood portion of the vehicle 104. The visual representation 602 may be generated based on the stored 3D model in the memory 210 of the electronic system 102 of the vehicle 104.

The control circuitry 202 may be further configured to retrieve a portion of the specification information associated with the visual representation 602. For example, the portion of the specification information may include identification information of the components of the vehicle 104 that may appear in the generated visual representation 602. The components visible in the generated visual representation 602 may include the hood cover 604, the wipers 606, and the headlight 608. The control circuitry 202 may be configured to overlay the retrieved portion of the specification information on the visual representation 602. The control circuitry 202 may be further configured to control the display of the user-assistive information on the display screen 108. The user-assistive information may include the generated visual representation 602 and the portion of the specification information. For example, the portion of the specification information may be displayed as labels (such as the identification information), such as "Headlight", "Hood Cover", and "Wipers" (as shown in FIG. 6A) to represent the components of the vehicle 104 visible in the visual representation 602.

The control circuitry 202 may be further configured to generate a plurality of visual representations corresponding to a first plurality of views of the vehicle 104 and a second plurality of views of the components of the vehicle 104. The user 112 may navigate through the generated plurality of visual representations based on a user input, such as a swiping action on a touch portion of the display screen 108. The control circuitry 202 may be further configured to control the display of the generated plurality of visual representations for a seamless navigation through the first plurality of views of the vehicle 104 or the second plurality of views of the component of the vehicle 104.

In an example, a touch-based user input may be received by the control circuitry 202, via the display screen 108, to zoom into the displayed visual representation 602 and visualize components of the vehicle 104 that lie beneath the hood cover 604. In another example, a gesture-based user input may be received by the control circuitry 202 to zoom into the displayed visual representation 602 and pan through the components of the vehicle 104 beneath the hood cover 604 of the vehicle 104. In yet another example, a touch-based user input may be received by the control circuitry 202, via the display screen 108, to swipe and update a view of the hood portion in the displayed visual representation 602 to a new view, in accordance with the swiping action of the touch-based user-input. The new view may be different from the top view of the hood portion of the vehicle 104. In accordance with an embodiment, the user input may be received via a set of UI options, for example, the set of UI options 502, 504, 506, 508, 510, and 512 (as shown in FIGS. 5A and 5B), in the displayed UI 108A on the display screen 108.

With reference to FIG. 6B, there is shown a visual representation 610 on the display screen 108. The control circuitry 202 may be configured to update the user-assistive information on the display screen 108 to display the visual representation 610. The visual representation 610 may be part of the user-assistive information updated based on the received user input. The control circuitry 202 may be configured to update the user-assistive information on the display screen 108 to display a portion of the specification information that may be associated with the visual representation 610.

The control circuitry 202 may be configured to generate the visual representation 610, based on the stored 3D model. The control circuitry 202 may be configured to update the user-assistive information to include the visual representation 610 on the display screen 108, based on the received user input. For example, the visual representation 610 may depict different components of the vehicle 104 that lie beneath the hood cover 604 of the vehicle 104. The different components may include, but are not limited to, a battery 612, an engine coolant reserve tank 614, a radiator cap 616, a washer fluid area 618, a brake fluid area 620, an engine oil fill cap 622, and an engine oil dipstick 624.

The control circuitry 202 may be further configured to retrieve a portion of the specification information associated with the visual representation 610. For example, the portion of the specification information may include identification information of the different components of the vehicle 104 visible in the visual representation 610. In accordance with an embodiment, the portion of the specification information associated with the visual representation 610 may also include current condition information of the different components of the vehicle 104, such as a current condition of the battery 612, a current level of the engine coolant reserve tank 614, and a current level of washer fluid in the washer fluid area 618. The control circuitry 202 may be further configured to overlay the retrieved portion of the specification information on the visual representation 610. The control circuitry 202 may be configured to control the display of the updated user-assistive information that includes the visual representation 610 and the portion of the specification information on the display screen 108.

It may be noted that the components shown in the visual representation 602 and the visual representation 610 are only shown as an example. In some embodiments, the generated visual representation 602 and the generated visual representation 610 may depict different components of the vehicle 104, without a deviation from the scope of the present disclosure.

Figure 7:
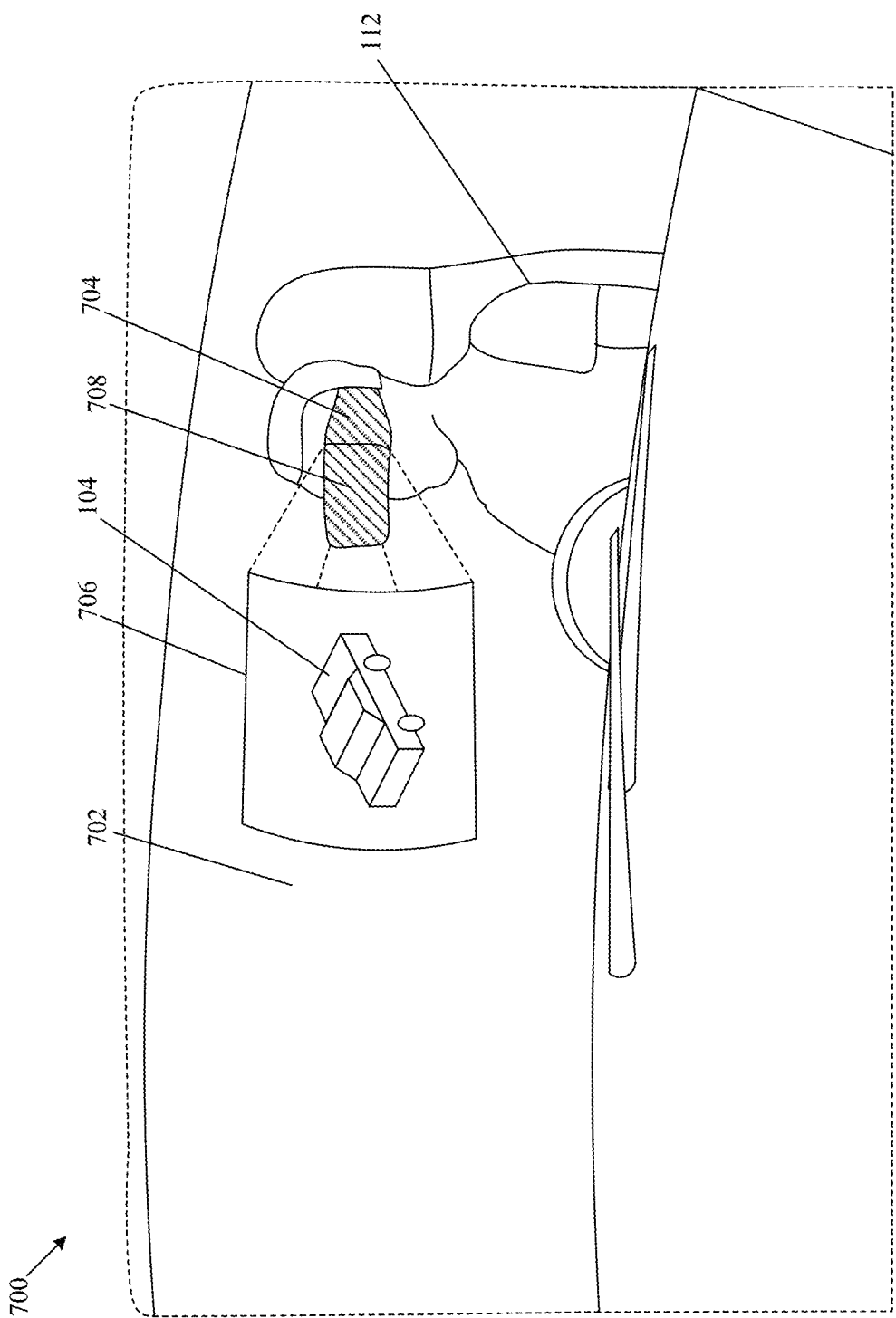
FIG. 7 illustrates an exemplary scenario for display of user-assistive information on a display screen of an Augmented Reality (AR) device, in accordance with an embodiment of the disclosure.

FIG. 7 illustrates an exemplary scenario for display of user-assistive information on a display screen of an Augmented Reality (AR) device, in accordance with an embodiment of the disclosure. FIG. 7 is explained in conjunction with elements from FIGS. 1, 2, 3, 4, 5A, 5B, 6A, and 6B. With reference to FIG. 7, there is shown an exemplary scenario 700 for display of user-assistive information. In the exemplary scenario 700, there is shown a section 702 of the vehicle 104, an AR device 704, and a visual representation 706. The visual representation 706 may be projected onto a display screen 708 of the AR device 704. The AR device 704 may be communicatively coupled with the control circuitry 202, via the communication network 110. In the exemplary scenario 700, the control circuitry 202 is a part of an in-vehicle AR environment or an in-vehicle VR environment. The AR device 704 may be worn by one or more users, such as the user 112, of the vehicle 104. In some embodiments, the electronic system 102 may include the AR device 704. In such cases, the 3D model may be stored in the AR device 704 and the control circuitry 202 may retrieve the 3D model from the AR device 704, via the communication network 110.

The control circuitry 202 may be configured to receive a user input to display user-assistive information associated with the vehicle 104. Examples of the user-assistive information may include, but are not limited to, navigation information (such as route details, nearby vehicles, and traffic data), a 3D graphic model of the vehicle 104, and a 2D visual representations of the vehicle 104. In response to the received user input, the control circuitry 202 may be configured to generate the visual representation 706 that may corresponds to a first view of the vehicle 104. The visual representation may be generated based on the 3D model. The 3D model may be stored in the electronic system 102 of the vehicle 104. The control circuitry 202 may be further configure to control the display of the user-assistive information that includes the generated visual representation 706 on the display screen 708 of the AR device 704.

In accordance with an embodiment, the control circuitry 202 may be configured to control the AR device 704 to display a 3D graphical model of the vehicle 104 or the component of the vehicle 104 in the AR/VR environment. For example, the 3D graphical model of the vehicle 104 or the component of the vehicle 104 may be rendered on the display screen 708 of the AR device 704. Also, the 3D graphical model of the vehicle 104 may be displayed on the display screen 708 of the AR device 704 for navigation of the vehicle 104.

Figure 8:
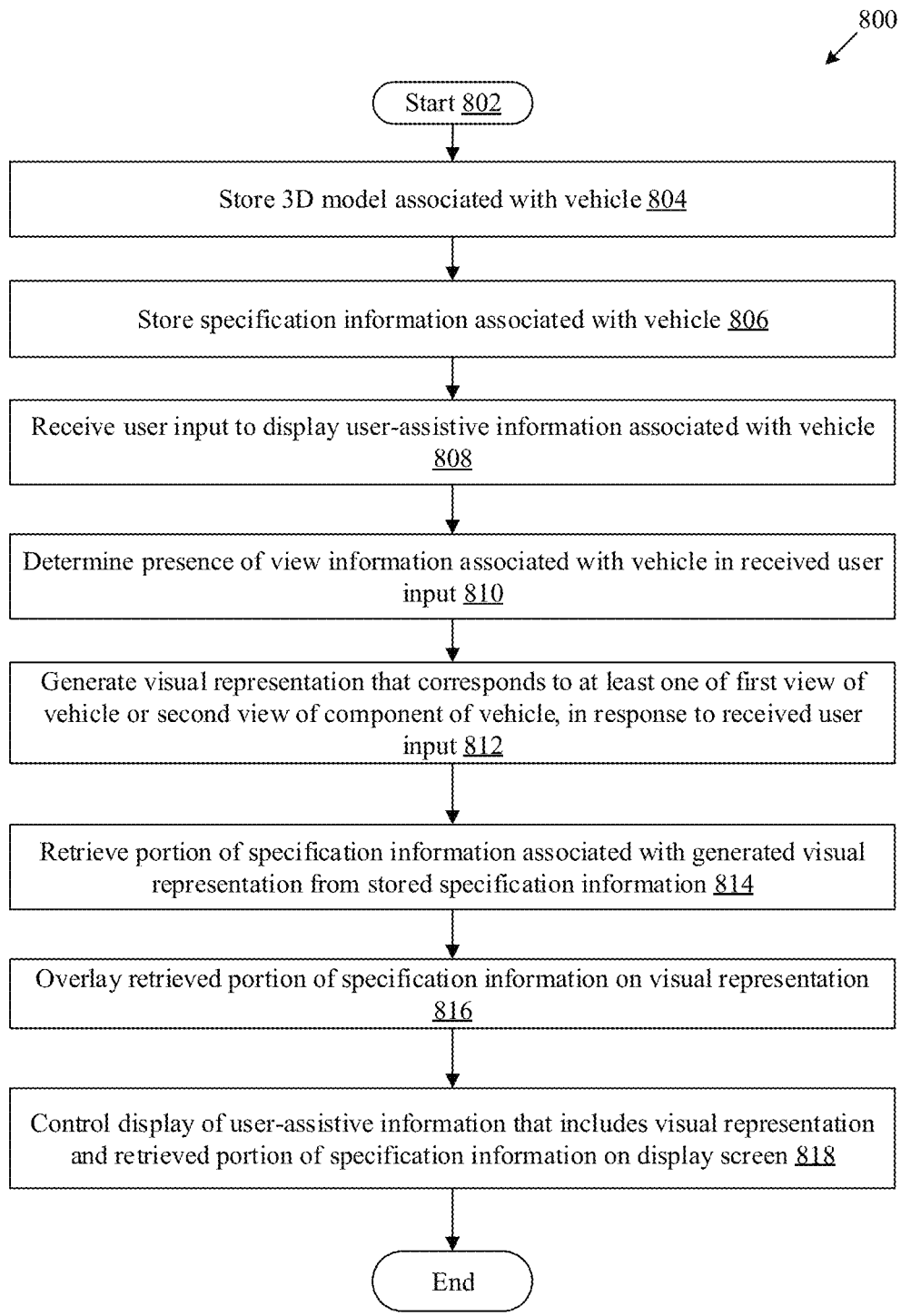
FIG. 8 depicts a flow chart that illustrates exemplary operations for display of visual representations of vehicle associated information, in accordance with an embodiment of the disclosure.

FIG. 8 depicts a flowchart that illustrates exemplary operations for display of visual representations of vehicle associated information based on a 3D model, in accordance with an embodiment of the disclosure. With reference to FIG. 8, there is shown a flowchart 800. The flowchart 800 is described in conjunction with FIGS. 1, 2, 3, 4, 5A, 5B, 6A, 6B, and 7. The operations from 804 to 818 may be implemented in the electronic system 102 of the vehicle 104. The operations of the flowchart 800 may start at 802 and proceed to 804.

At 804, the 3D model associated with the vehicle 104 may be stored. The memory 210 may be configured to store the 3D model associated with the vehicle 104. The stored 3D model may be the trained ML model that may be trained using the first set of 2D images as the training data. The first set of 2D images may correspond to a plurality of images associated with the vehicle 104 or one or more features of the vehicle 104. Each of the plurality of images may be indicative of a different view of a defined number of views associated with the vehicle 104.

At 806, the specification information associated with the vehicle 104 may be stored. The memory 210 may be configured to store the specification information associated with the vehicle 104. The specification information may include at least one of model identification information, dimensional information, color information of the vehicle 104, or information associated with a plurality of components of the vehicle 104.

At 808, a user input may be received to display user-assistive information associated with the vehicle 104. The control circuitry 202 may be configured to receive the user input to display the user-assistive information associated with the vehicle 104.

At 810, a presence of view information associated with the vehicle 104 in the received user input may be determined. The control circuitry 202 may be configured to determine whether there is the presence of view information associated with the vehicle 104, in the received user input. The view information may be information associated with at least a first view of the vehicle 104 or a second view of the component of the vehicle 104.

At 812, the visual representation may be generated that corresponds to at least one of the first view of the vehicle 104 or the second view of the component of the vehicle 104, in response to the received user input. The control circuitry 202 may be configured to generate the visual representation that corresponds to at least one of the first view of the vehicle 104 or the second view of the component of the vehicle 104. The generated visual representation may be a 2D visual representation. The first view of the vehicle 104 or the second view of the component of the vehicle 104 may be different from views depicted in the first set of 2D images.

At 814, a portion of the specification information associated with the generated visual representation may be retrieved from the stored specification information. The control circuitry 202 may be configured to retrieve the portion of the specification information associated with the generated visual representation from the stored specification information.

At 816, the retrieved portion of the specification information may be overlaid on the visual representation. The control circuitry 202 may be configured to overlay the retrieved portion of the specification information on the visual representation.

At 818, display of the user-assistive information that includes the visual representation and the retrieved portion of the specification information may be controlled. The control circuitry 202 may be configured to control the display of the user-assistive information on the display screen 108. The user-assistive information may include the visual representation and the retrieved portion of the specification information. Control passes to end.

Some embodiments of the disclosure provide an electronic system for a vehicle. The electronic system (such as the electronic system 102 (FIG. 1)) for the vehicle (such as the vehicle 104 (FIG. 1)) may include a memory (such as the memory 210 (FIG. 2)) and control circuitry (such as the control circuitry 202 (FIG. 2)). The memory may be configured to store a three-dimensional (3D) model (such as the 3D model 412 (FIG. 4)) associated with the vehicle. The 3D model may be a trained machine learning (ML) model that may be trained using a first set of two-dimensional (2D) images as training data associated with the vehicle. The control circuitry may be configured to receive a user input to display user-assistive information associated with the vehicle. The control circuitry may be configured to generate a visual representation that corresponds to at least one of a first view of the vehicle or a second view of a component of the vehicle, in response to the received user input. The visual representation may be generated based on the stored 3D model. The generated visual representation may be different from the first set of 2D images. The control circuitry may be configured to control display of the user-assistive information that comprises the generated visual representation on a display screen (such as the display screen 108 (FIG. 1)) of the vehicle.

In accordance with an embodiment, the control circuitry may be further configured to update the 3D model based on supplemental information from a server (such as the server 106 (FIG. 1)). The supplemental information may comprise at least one of a current state of the vehicle or a current state of the component of the vehicle. The control circuitry may be further configured to receive the first set of 2D images as the training data associated with the vehicle. The training data may correspond to a defined number of views associated with the vehicle or one or more features of the vehicle. The control circuitry may be configured to generate the 3D model of the vehicle by training an untrained ML model based on the training data associated with the vehicle.

In accordance with an embodiment, the generated visual representation may be a 2D visual representation. The first view of the vehicle in the generated visual representation may be different from a defined number of views associated with the vehicle in the training data. The second view of the component of the vehicle in the generated visual representation may be different from a defined number of views associated with the vehicle in the training data.

In accordance with an embodiment, the control circuitry may be further configured to determine a presence of view information associated with the vehicle in the received user input. The control circuitry may be further configured to select the first view of the vehicle for the visual representation based on the determination of the presence of the view information in the received user input. The first view may correspond to a default first view of the vehicle based on absence of the view information in the received user input. The control circuitry may be further configured to select the second view of the component of the vehicle for the visual representation based on the determination of the presence of the view information in the received user input. The second view may correspond to a default second view of the component of the vehicle based on absence of the view information in the received user input.

In accordance with an embodiment, the memory may be further configured to store specification information associated with the vehicle. The specification information may comprise at least one of a model identification information, dimensional information, color information of the vehicle, or information associated with a plurality of components of the vehicle. The control circuitry may be further configured to retrieve, from the memory, a portion of the specification information associated with the generated visual representation. The control circuitry may be further configured to overlay the retrieved portion of the specification information on the visual representation. The user-assistive information may further comprise the retrieved portion of the specification information associated with the generated visual representation.

In accordance with an embodiment, the control circuitry may be further configured to display a user interface (UI) (such as the UI 108A (FIG. 1) onto the display screen. The user-assistive information may be displayed on the UI. The control circuitry may be configured to enable a set of UI options on the UI. The control circuitry may receive the user input corresponding to a selection of a first UI option of the enabled set of UI options. The control circuitry may be further configured to update the user-assistive information on the display screen, based on the user input corresponding to the selection of the first UI option.

In accordance with an embodiment, the control circuitry may be further configured to generate a plurality of visual representations that correspond to at least a first plurality of views of the vehicle or a second plurality of views of the component of the vehicle. The control circuitry may be configured to control display of the user-assistive information that comprises the generated plurality of visual representations on the display screen, based on the user input. The display of the generated plurality of visual representations may be controlled for a seamless navigation through at least the first plurality of views of the vehicle or the second plurality of views of the component of the vehicle. In accordance with an embodiment, the control circuitry may be further configured to render a 3D graphical model or a 3D vector representation of at least the vehicle or the component of the vehicle on the display screen, based on the stored 3D model. The generated visual representation may include the rendered 3D graphical model of at least one of the first view of the vehicle or the second view of the component of the vehicle.

Other embodiments of the disclosure provide a vehicle that includes a memory and control circuitry. The memory may store a three-dimensional (3D) model associated with the vehicle. The 3D model may be a trained machine learning (ML) model that may be trained using a first set of two-dimensional (2D) images as training data associated with the vehicle. The control circuitry may be configured to receive a user input for a display of user-assistive information associated with the vehicle. The control circuitry may be further configured to generate a visual representation that corresponds to at least one of a first view of the vehicle or a second view of a component of the vehicle, in response to the received user input. The visual representation may be generated based on the stored 3D model. The visual representation may be a new 2D image different from the first set of 2D images. The control circuitry may be configured to control the display of the user-assistive information that comprises the generated visual representation on a display screen of the vehicle.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; and b) reproduction in a different material form. While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims.

What is claimed is:

1. An electronic system for a vehicle, comprising:
a memory configured to store a three-dimensional (3D) model associated with the vehicle, wherein the 3D model is a trained machine learning (ML) model that is trained using a first set of two-dimensional (2D) images as training data associated with the vehicle, wherein the training data corresponds to a defined number of views associated with the vehicle or one or more features of the vehicle; and
control circuitry configured to:
  receive a user input to display user-assistive information associated with the vehicle;
  in response to the received user input, generate a visual representation that corresponds to at least one of a first view of the vehicle or a second view of a component of the vehicle, wherein the visual representation is generated based on the stored 3D model, wherein the generated visual representation is a 2D image different from the first set of 2D images, and wherein the at least one of the first view of the vehicle or the second view of the component of the vehicle in the generated visual representation is different from the defined number of views associated with the vehicle or one or more features of the vehicle in the training data; and
  control display of the user-assistive information that comprises the generated visual representation on a display screen in the vehicle.

2. The electronic system according to claim 1, wherein the control circuitry is further configured to update the 3D model based on supplemental information from a server, wherein the supplemental information comprises at least one of a current state of the vehicle or a current state of the component of the vehicle.

3. The electronic system according to claim 1, wherein the control circuitry is further configured to:
receive the first set of 2D images as the training data associated with the vehicle; and
generate the 3D model of the vehicle by training an untrained ML model based on the training data associated with the vehicle.

4. The electronic system according to claim 1, wherein the control circuitry is further configured to determine whether there is a presence of view information associated with the vehicle in the received user input.

5. The electronic system according to claim 4, wherein the control circuitry is further configured to select the first view of the vehicle for the visual representation based on the determination of the presence of the view information in the received user input,
wherein the first view corresponds to a default first view of the vehicle based on absence of the view information in the received user input.

6. The electronic system according to claim 5, wherein the control circuitry is further configured to select the second view of the component of the vehicle for the visual representation based on the determination of the presence of the view information in the received user input,
wherein the second view corresponds to a default second view of the component of the vehicle based on absence of the view information in the received user input.

7. The electronic system according to claim 1, wherein the memory is further configured to store specification information associated with the vehicle,
wherein the specification information comprises at least one of a model identification information, dimensional information, color information of the vehicle, or information associated with a plurality of components of the vehicle.

8. The electronic system according to claim 7, wherein the control circuitry is further configured to:
retrieve, from the memory, a portion of the specification information associated with the generated visual representation; and
overlay the retrieved portion of the specification information on the visual representation.

9. The electronic system according to claim 8, wherein the user-assistive information further comprises the retrieved portion of the specification information associated with the generated visual representation.

10. The electronic system according to claim 1, wherein the control circuitry is further configured to:
display a user interface (UI) onto the display screen, wherein the user-assistive information is displayed on the UI;
enable a set of UI options on the UI; and
receive the user input corresponding to a selection of a first UI option of the enabled set of UI options; and
update the user-assistive information on the display screen, based on the user input corresponding to the selection of the first UI option.

11. The electronic system according to claim 1, wherein the control circuitry is further configured to:
generate a plurality of visual representations that correspond to at least a first plurality of views of the vehicle or a second plurality of views of the component of the vehicle; and
control display of the user-assistive information that comprises the generated plurality of visual representations on the display screen, based on the user input.

12. The electronic system according to claim 11, wherein the display of the generated plurality of visual representations is controlled for a seamless navigation through at least the first plurality of views of the vehicle or the second plurality of views of the component of the vehicle.

13. The electronic system according to claim 1, wherein the control circuitry is further configured to render a 3D graphical model or a 3D vector representation of at least the vehicle or the component of the vehicle on the display screen, based on the stored 3D model.

14. The electronic system according to claim 13, wherein the generated visual representation comprises the rendered 3D graphical model of at least one of the first view of the vehicle or the second view of the component of the vehicle.

15. A vehicle, comprising:
a memory configured to store a three-dimensional (3D) model associated with the vehicle, wherein the 3D model is a trained machine learning (ML) model that is trained using a first set of two-dimensional (2D) images as training data, wherein the training data corresponds to a defined number of views associated with the vehicle or one or more features of the vehicle; and
control circuitry configured to:
receive a user input for a display of user-assistive information;
in response to the received user input, generate a plurality of visual representations that correspond to at least one of a first plurality of views of a section of the vehicle or a second plurality of views of a component of the vehicle,
wherein the plurality of visual representations are generated based on the stored 3D model, and
wherein the generated plurality of visual representations are new 2D images different from the first set of 2D images; and
control the display of the user-assistive information that comprises the generated plurality of visual representations on a display screen,
wherein the display of the generated plurality of visual representations is controlled for a seamless navigation through at least the first plurality of views of the section of the vehicle or the second plurality of views of the component of the vehicle.

16. A method for a vehicle, comprising:
in an electronic device:
storing a three-dimensional (3D) model associated with the vehicle, wherein the 3D model is a trained machine learning (ML) model that is trained using a first set of two-dimensional (2D) images as training data associated with the vehicle, wherein the training data corresponds to a defined number of views associated with the vehicle; and
receiving a user input for a display of user-assistive information associated with the vehicle;
in response to the received user input, generating a visual representation that corresponds to at least one of a first view of the vehicle or a second view of a component of the vehicle, wherein the visual representation is generated based on the stored 3D model, wherein the generated visual representation is a 2D image different from the first set of 2D images, and wherein the at least one of the first view of the vehicle or the second view of the component of the vehicle in the generated visual representation is different from the defined number of views associated with the vehicle or one or more features of the vehicle in the training data;
controlling the display of the user-assistive information that comprises the generated visual representation on a display screen.

17. The method according to claim 16, further comprising updating the 3D model based on supplemental information from a server, wherein the supplemental information comprises at least one of a current state of the vehicle or a current state of the component of the vehicle.

18. The method according to claim 16, further comprising:
receiving the first set of 2D images as the training data associated with the vehicle; and
generating the 3D model of the vehicle by training an untrained ML model on the training data associated with the vehicle.

* * * * *